US005572329A

United States Patent [19]

Otsubo et al.

[11] Patent Number: 5,572,329
[45] Date of Patent: Nov. 5, 1996

[54] APPARATUS AND METHOD FOR SCANNED MULTI-LEVEL IMAGE RECORDING

[75] Inventors: Toshihiko Otsubo, Tama; Yuji Matsuda, Mitaka, both of Japan

[73] Assignee: Canon Kabushiki Kaisha, Tokyo, Japan

[21] Appl. No.: 105,680

[22] Filed: Aug. 13, 1993

[30] Foreign Application Priority Data

Aug. 21, 1992 [JP] Japan .................................. 4-222713

[51] Int. Cl.$^6$ ............................ H04N 1/00; H04N 1/034; H04N 1/46; B41J 2/145
[52] U.S. Cl. ............................. 358/296; 358/502; 347/3; 347/40
[58] Field of Search ...................................... 358/296, 298, 358/404, 406, 444, 471, 472, 474, 482, 483, 494, 496–498, 502; 347/3, 4, 40–43, 131, 171, 180–184, 188, 190, 224, 238; 395/108, 115, 116

[56] References Cited

U.S. PATENT DOCUMENTS

| 4,313,129 | 1/1982 | Hara ..................................... 346/140 R |
| 4,345,262 | 8/1982 | Shirato et al. ...................... 346/140 R |
| 4,459,600 | 7/1984 | Sato et al. ........................... 346/140 R |
| 4,463,359 | 7/1984 | Ayata et al. .............................. 346/1.1 |
| 4,558,333 | 12/1985 | Sugitani et al. .................... 346/140 R |
| 4,723,129 | 2/1988 | Endo et al. ............................... 346/1.1 |
| 4,740,796 | 4/1988 | Endo et al. ............................... 346/1.1 |
| 4,851,923 | 7/1989 | Abe et al. ................................ 358/296 |
| 4,933,776 | 6/1990 | Ikeda ....................................... 358/456 |
| 4,967,203 | 10/1990 | Doan et al. ............................... 346/1.1 |
| 4,999,646 | 3/1991 | Trask .......................................... 346/11 |
| 5,189,521 | 2/1993 | Ohtsubo et al. ......................... 358/296 |
| 5,315,404 | 5/1994 | Kuboki et al. ............................ 358/433 |
| 5,406,392 | 4/1995 | Aoki et al. ............................. 347/43 X |
| 5,416,596 | 5/1995 | Suzuki et al. ............................ 358/298 |
| 5,430,469 | 7/1995 | Shioya et al. .......................... 347/40 X |
| 5,440,410 | 8/1995 | Sugishima ................................ 358/502 |

FOREIGN PATENT DOCUMENTS

| 59-123670 | 7/1984 | Japan .................................. B41J 3/04 |
| 59-138461 | 8/1984 | Japan .................................. B41J 3/04 |
| 2087116 | 5/1982 | United Kingdom ............... B41J 3/12 |
| 0517544 | 12/1992 | United Kingdom ............. H04N 1/40 |
| 92-17340 | 10/1992 | WIPO .................................. B41J 2/51 |

Primary Examiner—Peter S. Wong
Assistant Examiner—Eric Frahm
Attorney, Agent, or Firm—Fitzpatrick, Cella, Harper & Scinto

[57] ABSTRACT

An image processing apparatus for recording a read image upon a recording medium. If a reading width of an image reading sensor is wider than a recording width of a recording head, the apparatus controls scanning of the image sensor and the recording head. The recording head comprises uniformly aligned recording elements divided into a plurality of groups. Image data read by the image sensor is stored into a memory, then used for activating the recording elements of the recording head. The apparatus conveys a recording medium by a length corresponding to one recording element group at each scanning of the recording head. If the amount of meaningless data or recorded data of the stored data corresponds to the amount of one scanning of the recording head or more, the image sensor performs the next reading.

44 Claims, 17 Drawing Sheets

DATA FOR THIRD NOZZLE GROUP
DATA FOR SECOND NOZZLE GROUP
DATA FOR FIRST NOZZLE GROUP

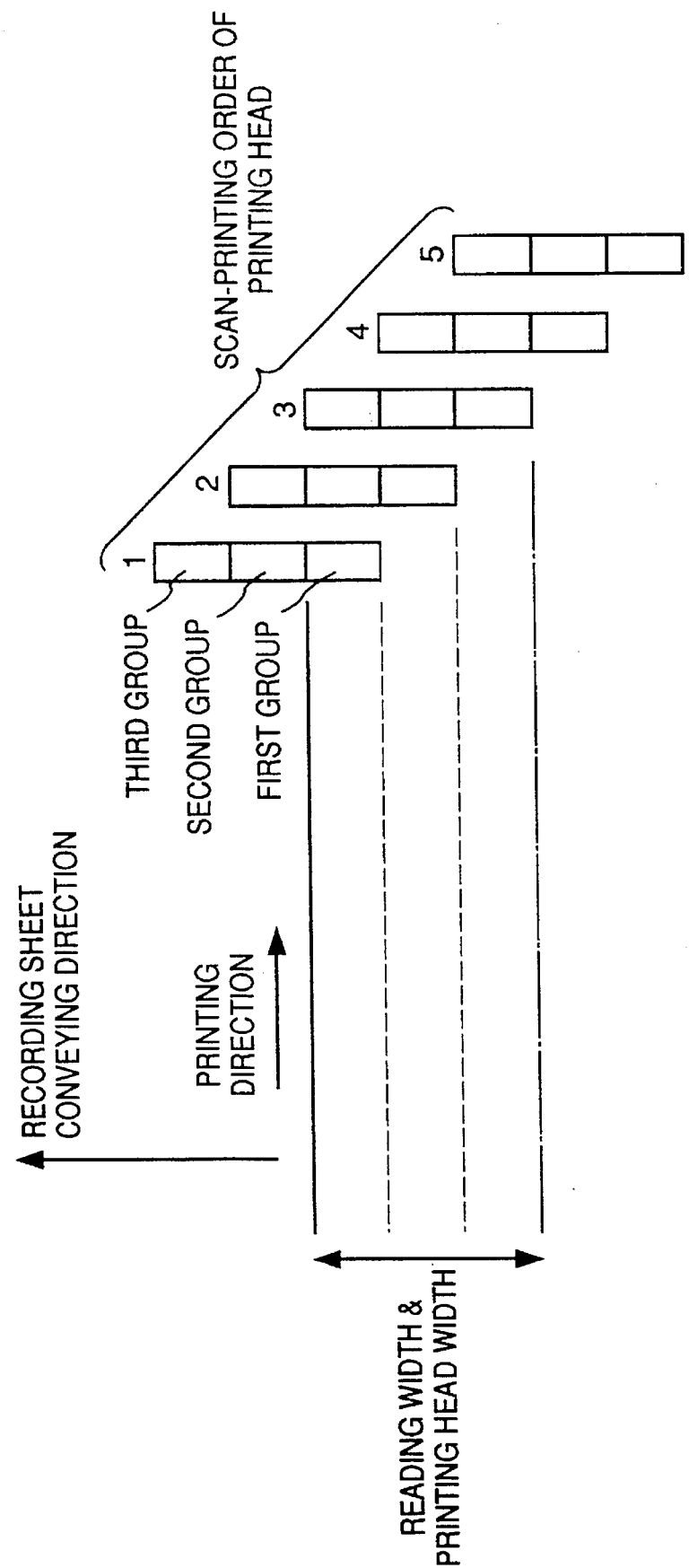

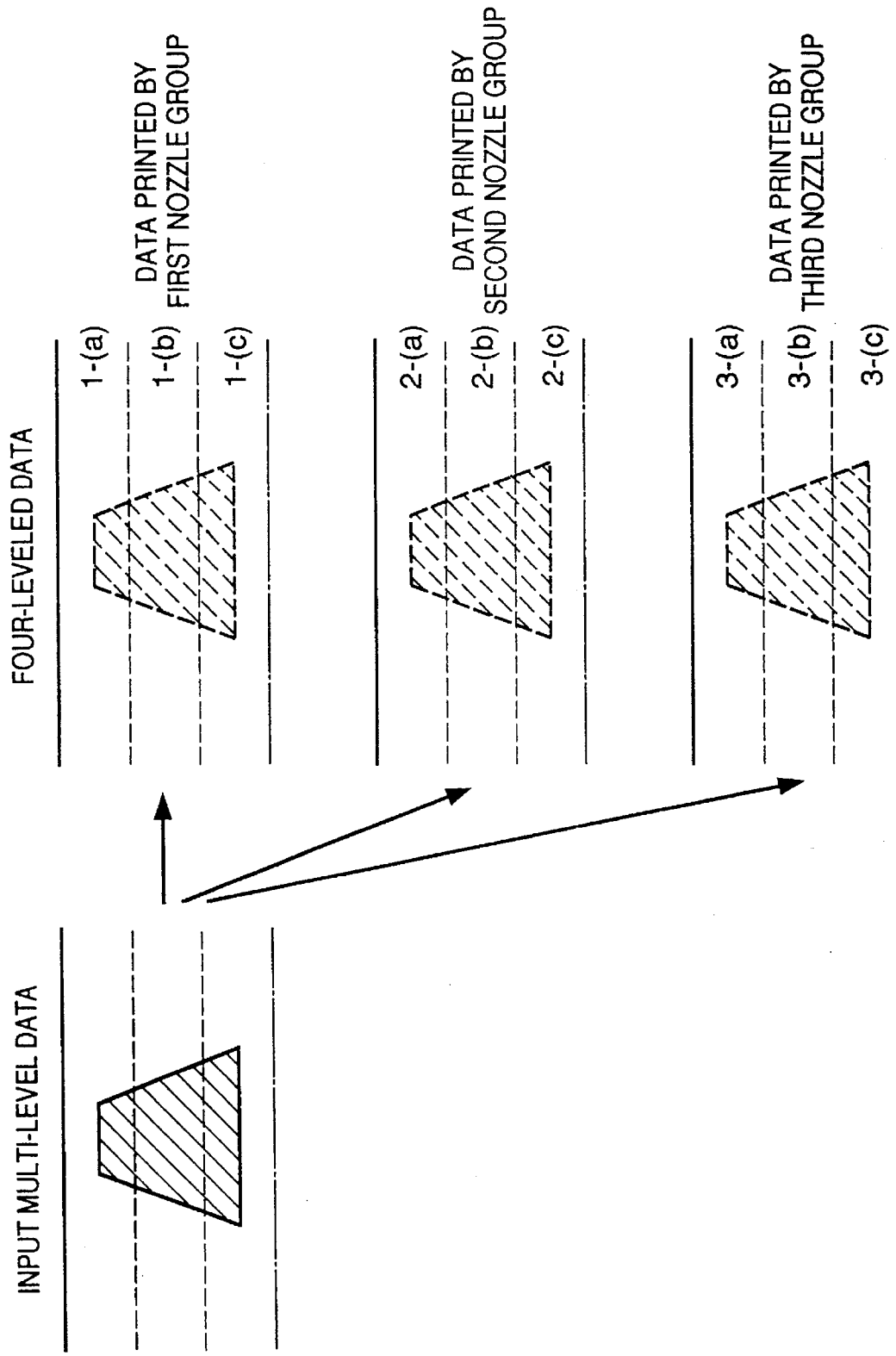

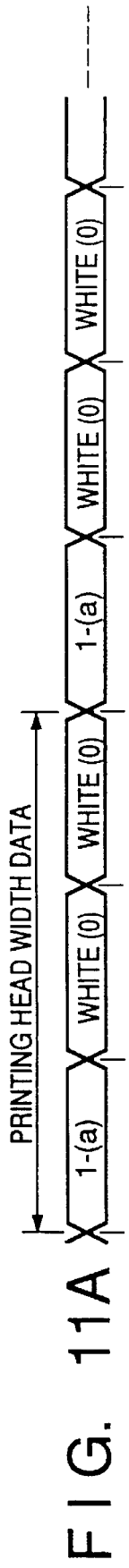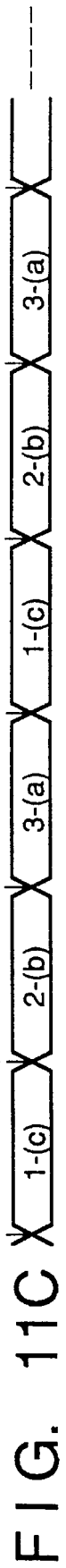

F I G. 13B
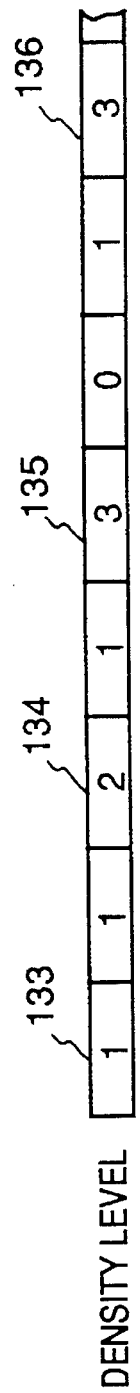
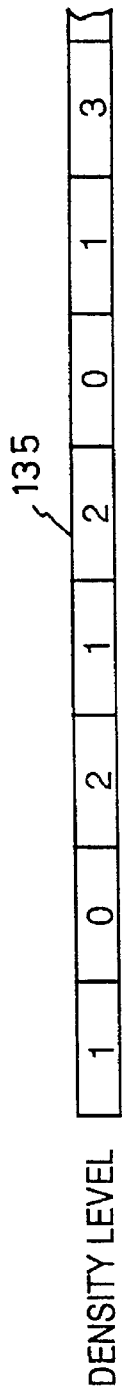
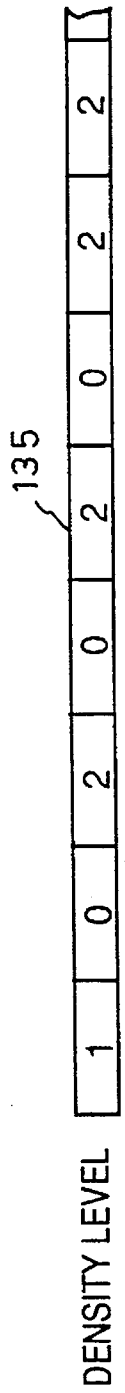

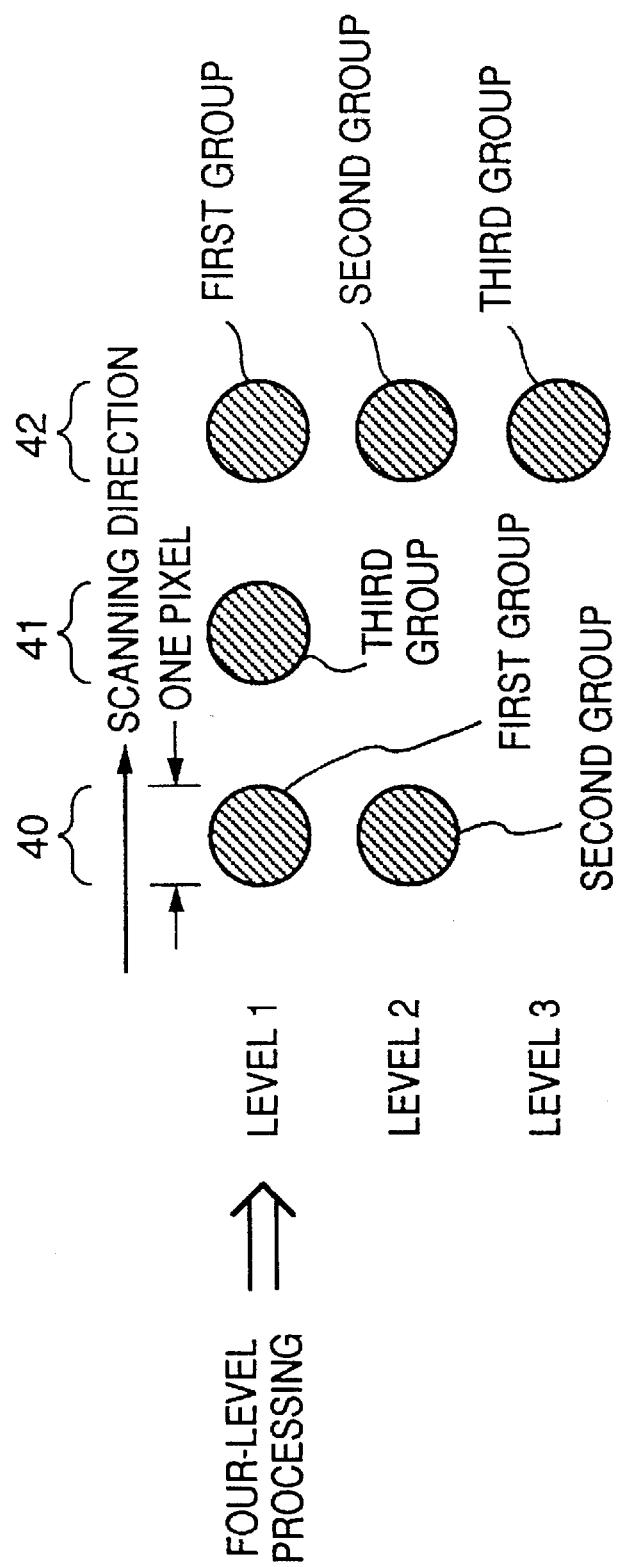

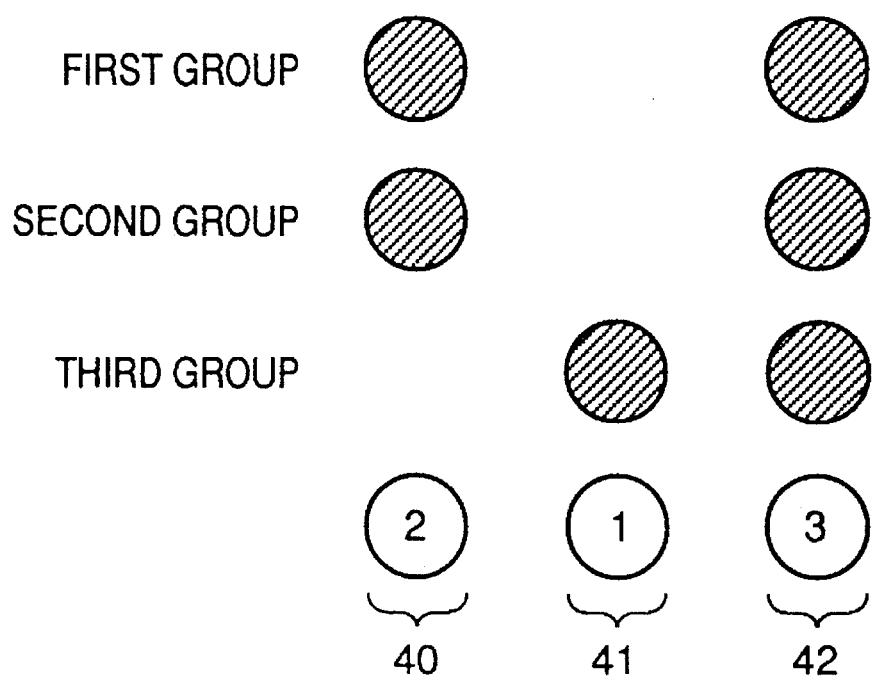

APPARATUS AND METHOD FOR SCANNED MULTI-LEVEL IMAGE RECORDING

BACKGROUND OF THE INVENTION

Present invention relates to an image processing apparatus and method for inputting an original image and copying the input image on a predetermined recording medium.

As an image processing apparatus of this type, an apparatus using the ink-jet method as its image recording mechanism has been provided.

Generally, binary image recording involves the steps of determining the status of a dot "black or white", which means discharging/not-discharging an ink, and representing a whole image with a mass of such black/white dots. Recent improvements in this technique have enabled half-tone image recording.

Various printing methods have been introduced as multi-level (half tone, gray-scale) image printing methods, e.g., the error diffusion method and the dither method. These methods basically use a plurality of minute pixels for representing one printing pixel. To form a gradation image, the number of minute pixels is changed to vary the area of one printing pixel.

One printing pixel is formed by repeating printing processing plural times. In contrast to the method for printing one printing with by one of two status (binary image printing method), the number of density levels of the multi-level printing increases in accordance with the number of printing processings, which allows subtle gradation expression.

Further, in order to improve printing speed in the multi-level image printing method, a multi-nozzle construction, i.e., the construction of a printing head comprising a plurality of nozzles (discharging elements, discharging portions) is employed.

In this case, small difference in ink discharge amount (volume) between the nozzles and differences in the shape of nozzles cause density differences between the nozzles. To reduce variations caused by these density differences diffusing the density difference has been considered. The technique makes the density variations unevenness visually inconspicuous and forms an excellent image. A detailed description of the technique will be given below with reference to FIG. 12 which shows the relation between a multi-nozzle head (here the number of the nozzles is thirty) and pixels to be recorded.

In FIG. 12, the printing head is divided into three parts A to C. One printing pixel is represented by a density value 0 to 3 (four-level value) which is attained by actually discharging from zero to three ink drops.

Upon recording, nozzles 1 to 10 perform a first stage of image recording; nozzles 11 to 20, a second stage of recording which is overstrike (overlap) printing on the first recorded image; and nozzles 21 to 30, a third stage of recording which is overstrike printing on the second recorded image. It should be noted that nozzles which discharge an ink drop are sequentially allotted in respective printing stages.

The recording is performed with the three-part printing head, repeating to convey a recording medium (a recording sheet) by ⅓ length of the recording width (10 dot lines) in a longitudinal direction at each scanning of the printing head.

The multi-level printing is performed in this manner. In FIG. 12, one printing pixel is represented by an area for three ink drops, which simplifies the explanation, however, in actual printing, three ink drops are discharged at the same position as overstrike recording.

However, a copying machine having the above printing mechanism has to repeat read-scanning three times while shifting the recording medium by ⅓ of the recording width for the second and third scannings to form a complete printing pixel, which takes a long period. In addition, image data density obtained in the second reading may be different from that obtained in the initial reading due to noise which occurs during the scanning, thus causing subtle difference in density levels between the original image and the output image. In a case where overstrike printing, as a second printing by the nozzles 11 to 20 from the second scanning, is made upon a printed image by the nozzles 1 to 10 from the first scanning, the second image data for the second printing is not necessarily the same as the first image data.

SUMMARY OF THE INVENTION

The present invention has been made in consideration of the above situation, and has as its object to provide an image processing apparatus which improves image quality, especially, multi-level image quality.

Another object of the present invention is to provide an image processing apparatus which records read image with high-quality.

Further, another object of the present invention is to provide an image processing apparatus which reduces the number of reading operations and prevents variation in printing data due to noise of image signals.

According to the present invention, the foregoing objects are attained by providing an image processing apparatus which records a multi-level image by scanning of a recording head having an array of M-pixel recording elements divided into N groups, and by conveying a recording medium By a width of one group at one scanning of the recording head, comprising: image reading means for reading an original image in band units, the band having a width corresponding to a width of the array of M-pixel recording elements; memory means for storing read image for at least two band units; recording data generation means for generating binary data corresponding to the respective groups of the recording head in accordance with the image data stored in the memory means; and control means for supplying the binary data generated by the recording data generation means to corresponding groups of the recording head.

Further, the foregoing object is attained by providing an image processing apparatus which records a multi-level image by scanning of a recording head having an array of M-pixel recording elements divided into N groups, and by conveying a recording medium by a width of one group at one scanning of the recording head, comprising: image reading means for reading an original image in band units, the band having a width corresponding to a width of the array of M-pixel recording elements; recording data generation means for generating binary data corresponding to the respective groups of the recording head in accordance with image data read by the image reading means;

memory means for storing the binary data generated by the recording data generation means for the respective groups of the recording head; and control means for supplying the binary data for the respective groups of the recording head stored in the memory means to the groups of the recording head respectively.

Further, the foregoing objects are attained by providing an image processing apparatus comprising: reading means, having reading elements of P-dot lines, for reading an original image by scanning; a recording head having M-recording elements divided into N-recording groups (N≧2); convey means for conveying a predetermined recording medium by one recording group width at one scanning of the recording head; memory means for storing read image data for at least two scannings of the reading means so as to provide the image data to said recording head; and control means for activating the reading means when there is no image data to be recorded for one scanning of the recording head or amount of recorded image data or meaningless image data in the memory means corresponds to amount of one scanning of the recording head.

It is another object of the present invention to provide a method for controlling an image processing apparatus for attaining the foregoing objects. Such a method can involve providing reading means, having a reading element for P-dot line, for reading an original image by scanning, a recording head having M-recording elements divided into N-recording groups (N≧2), and memory means for storing image data read by the reading means so as to record the data by the recording head, comprising: a convey step of conveying a predetermined recording medium by one recording group width at one scanning of the recording head; and a storage step of activating the reading means and storing the read image data into the memory means when there is no image data to be recorded for one scanning of the recording head or amount of recorded image data or meaningless image data in the memory means corresponds to amount of one scanning of the recording head.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 illustrates the relation between scanning of a printing head and recording contents in the second embodiment;

FIG. 10 illustrates memory contents for one recording color components in the second embodiment;

FIGS. 11A to 11C illustrate image data transferred to the printing head in the second embodiment;

FIGS. 13A and 13B are diagrams for explaining problems in overstrike recording;

FIG. 15 illustrates another example of dotallotting logic; and

FIG. 16 illustrates practical printing procedures in FIG. 15.

DETAILED DESCRIPTION THE PREFERRED EMBODIMENTS

Preferred embodiments of the present invention will be described in detail in accordance with the accompanying drawings.

In the embodiments, a large number of nozzles provided in a printing head are divided into three groups and such a three-part printing head runs along one line a number of times to record a multi-level image (divisional recording).

In these three groups, the first group is activated upon image recording over density level 1; the second group, over density level 2; and the third group, over density level 3. More specifically, the first and the second groups record the density level 2 pixels in a four-level image.

However, fixing a group for a density level in this manner may cause density unevenness due to density balance between the groups.

For this reason, even if an image pixel of density level 1 is recorded, the second or third groups is used as well as the first group, to suppress density unevenness due to the shape or diameter of the printing heads.

However, density unevenness of an output image may occur in this arrangement if the aforementioned conventional copying processing is employed.

The problems in the conventional processing will be described in detail with reference to FIGS. 13A and 13B.

Figure 13A:
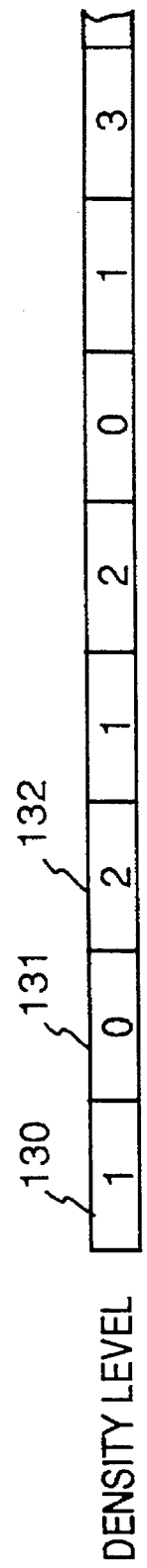

In FIGS. 13A and 13B, the printing head has thirty ink jet nozzles aligned in its longitudinal direction. The nozzles are divided into three groups (1–10, 11–20 and 21–31). The printing head records an image using four level (0–3 density level).

FIG. 13A shows ideal recording densities in one line of an image to be printed.

In FIG. 13A, the density level of pixel 130 is represented as "1" and the pixel 130 is recorded by nozzle 1 in the first block of the printing head. It should be noted that it is not because the density level is "1" that the nozzle 1 is employed. When the density level is "1" only nozzle 11 (the second group) or only nozzle 21 (the third group) may be used to discharge an ink drop In case of density level "1", any group can be used to discharge one ink drop, and the group can be determined by an appropriate rotation or using random numbers, an explanations of which will be omitted here.

The density level of pixel 131 is "0", indicating that it is not recorded by any nozzle. The density level of pixel 132 is "2", indicating that two ink drops are to be discharged. The nozzles used to discharge two ink drops for the pixel 132 are the nozzles 11 and 21. However, in this case, the nozzle 1 and the nozzle 21 may be used for the same reason as that in the explanation of the pixel 130.

As shown in FIG. 13A, the printing head scans the object line three times and records image having a density level order of 1, 0, 2, 1, 2, 0, 1, 3 . . . However, problems occur if the original is read at each motion of the printing head, for a reading of the same line of the same original does not always provide the same read data of the same density as data from a previous reading. Both the aforementioned noise and lack of uniformity of a scanner's reading characteristics are considered as factors of the problem.

FIG. 13B shows an example where the reading scanner reads the same line of the same image three times but the density levels in each reading are different.

In the first scanning, the nozzle 1 in the first group is to discharge an ink drop at pixel 133, 134, 135 and 136. Note that the parenthesized numeral denotes the nozzle to be used in subsequent scanning. For example, at the pixel 135, the density level of the first scanning is "3" (maximum density), and the nozzles 11 and 21 are preassigned for subsequent scannings. However, as the density level of the pixel 135 is "2" at the second and third scannings, and two ink drops are recorded. Accordingly, the recording result of the object line is as shown by numeral 137, which differs from that shown in FIG. 13A.

[First Embodiment]
<Construction of Apparatus>

Figure 1:
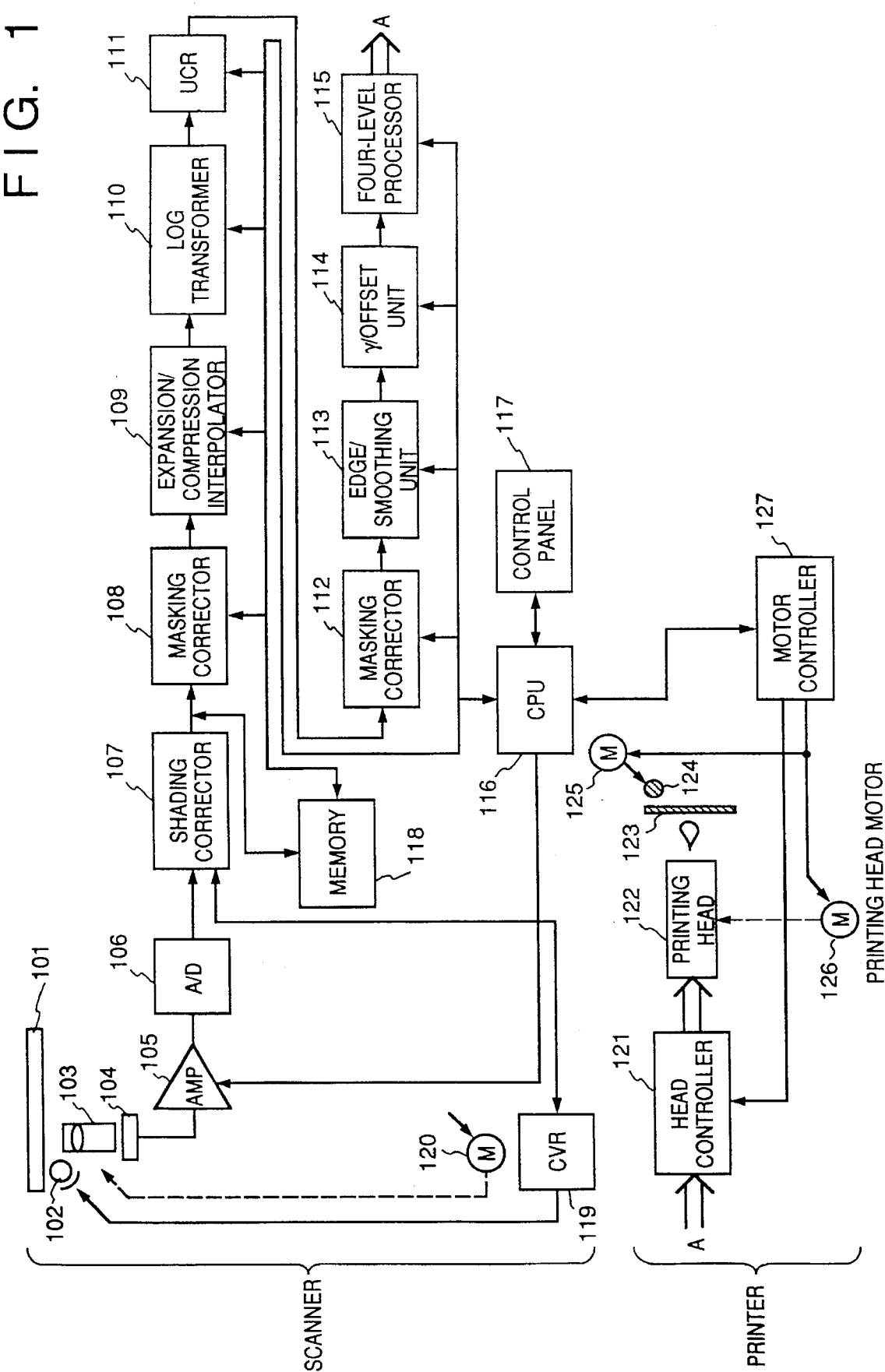
FIG. 1 is a block diagram showing the configuration of a copying machine in a first embodiment.

FIG. 1 is a block diagram showing the configuration of a copying machine according to the first embodiment. It should be noted that in this embodiment, one printing pixel is recorded by four density levels (zero to three) for simplification of explanation, however, it goes without saying that three levels or more levels, e.g., five density levels or six density level can be employed.

Similar to conventional copying machines, the copying machine in this embodiment comprises a scanner for reading an original image and a printer for recording the read image. The respective elements of the configuration will be described below.

Reference numeral 101 denotes a glass platen on which an original is placed; and 102, an illumination lamp for illuminating the original. The lamp 102 is charged by CVR 119, and the charge value is adjustable. Reflection light from the original is image-formed in image sensor (CCD) 104 via lens 103 and is converted into an electric signal. Amplifier 105 amplifies the signal to a predetermined amount and A/D converter 106 converts the amplified signal into digital image data (hereinafter simply referred to as "image data"). As the image data includes shading by the illumination lamp 102, the lens 103 and the image sensor 104, shading corrector 107 corrects the shading. Normally, the shading corrector corrects the input digital image signal such that the output resulting from inputting a value from reading a reference white plate value becomes the maximum.

The shading-corrected image data is provided to masking corrector 108 and memory 118. The masking corrector 108 corrects spectral characteristics of the image sensor 104. Expansion/compression interpolator 109 expands or compresses the image data outputted from the masking corrector 108. The interpolator 109 performs thinning upon compression, while it performs interpolation upon expansion. The operation of the interpolator 109 is publicly known and therefore an explanation of its operation will be omitted. Log transformer 110 converts the expanded/compressed luminance (RGB) signal into a density (CMY) signal. UCR (under color remover) processor 111 extracts a black (K) component from the signal, and masking corrector 112 performs color correction corresponding to the inks. Edge/smoothing unit 113 performs edge emphasis or smoothing upon the color-corrected signal. Thereafter, y/offset unit 114 performs density correction and supplies the corrected signal to four-level processor 115. The operation of the four-level processor 115 will be described later.

Numeral 116 denotes an operation controller (including a CPU, a ROM and a RAM) for controlling message indications, the control panel 117 and the operation of the aforementioned elements, further, for controlling motor 120 for moving a reader (the lens 103, the illumination lamp 102 and the image sensor 104) to a predetermined position.

The image signal ("A" in FIG. 1) read in the above manner is transferred to the printer section.

Head controller 121 transfers the signal A (CMYK) to printing head 122 for respective colors to perform printing. Numeral 123 denotes a recording medium (recording sheet); 124, a roller for conveying the recording medium 123; 125, a motor for rotationally driving the roller 124; 126, a motor for moving the printing head 122 (a carriage having printing heads for respective colors); and 127, a motor controller for controlling the motor 126.

<Image Reading and Printing Data Output>

Original image reading by the copying machine having the above construction and data output to the printing head 122 will be described in detail.

Figure 2:
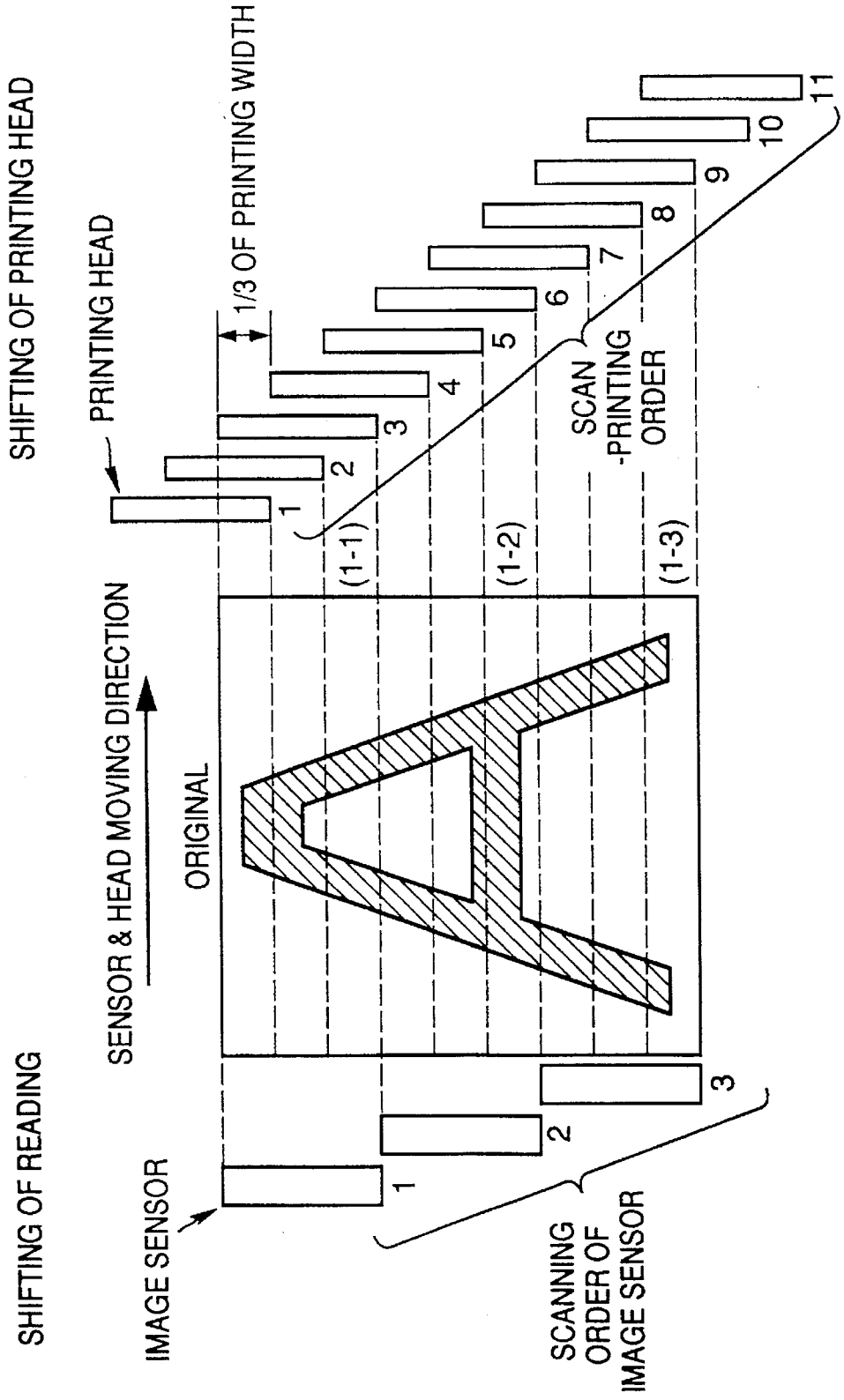
FIG. 2 illustrates the relation between reading of an original image and recording operation in the first embodiment.
Figure 3:
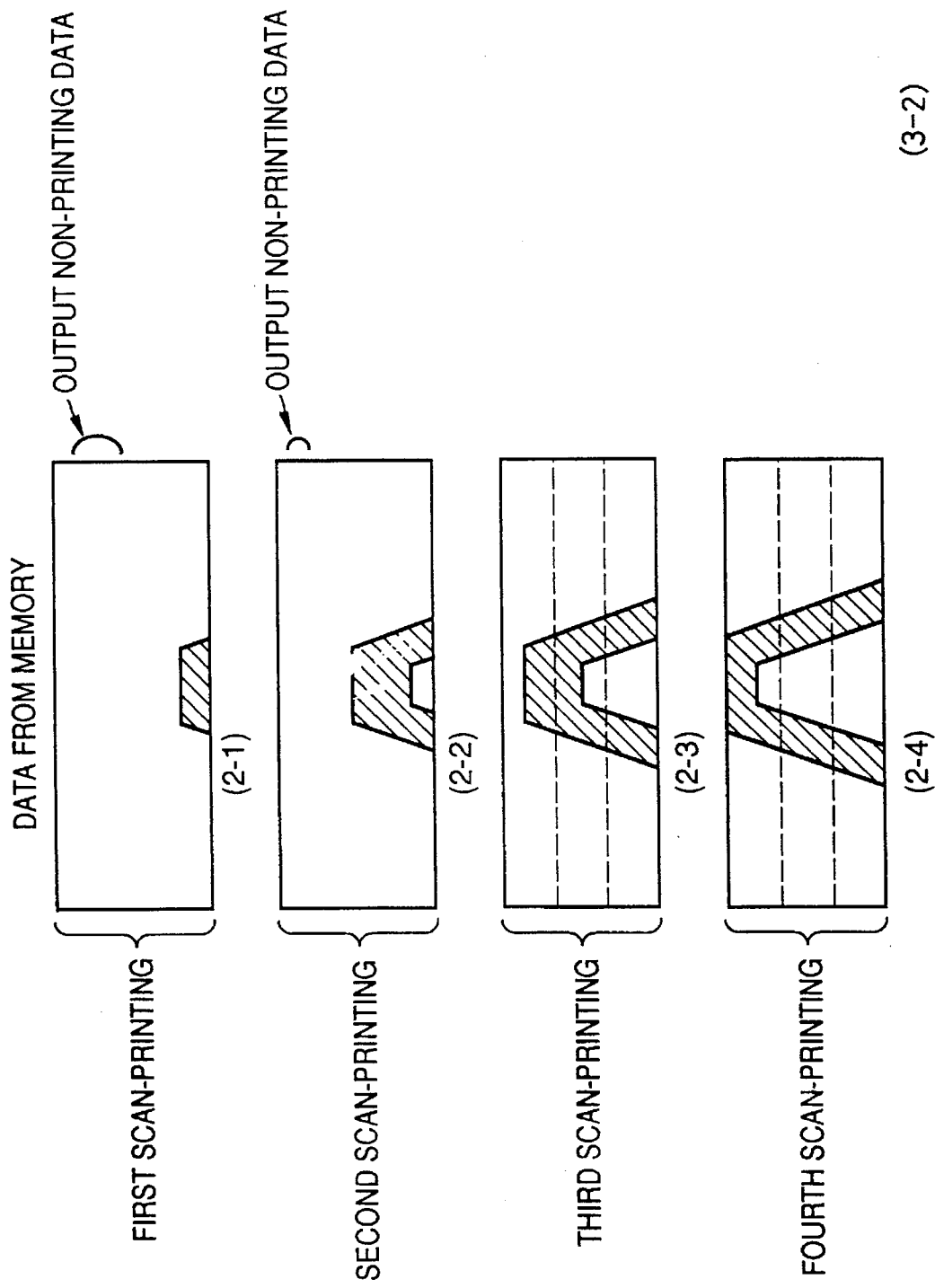
FIG. 3 illustrates an image recorded by scannings of a printing head in the first embodiment.

FIG. 2 is a diagram for explaining reading of an original image by the copying machine in the present embodiment. As shown in FIG. 2, as the image sensor scans once, the printing head scans three times, and the recording sheet is conveyed by ⅓ length of the recording width at each scanning of the printing head. Note that since the printing head runs over the top and the bottom of the image, the actual number of the scannings of the printing head is "the number of scannings of the image sensor ×3+2". In FIG. 2, the number of scannings of the image sensor is three and that of the printing head is eleven. FIG. 3 shows the correspondence of the scanning of the printing head to a recording image at each scanning. As described above, the recording is made by multiple scannings of the printing head for each scanning of the image sensor.

Figure 4:
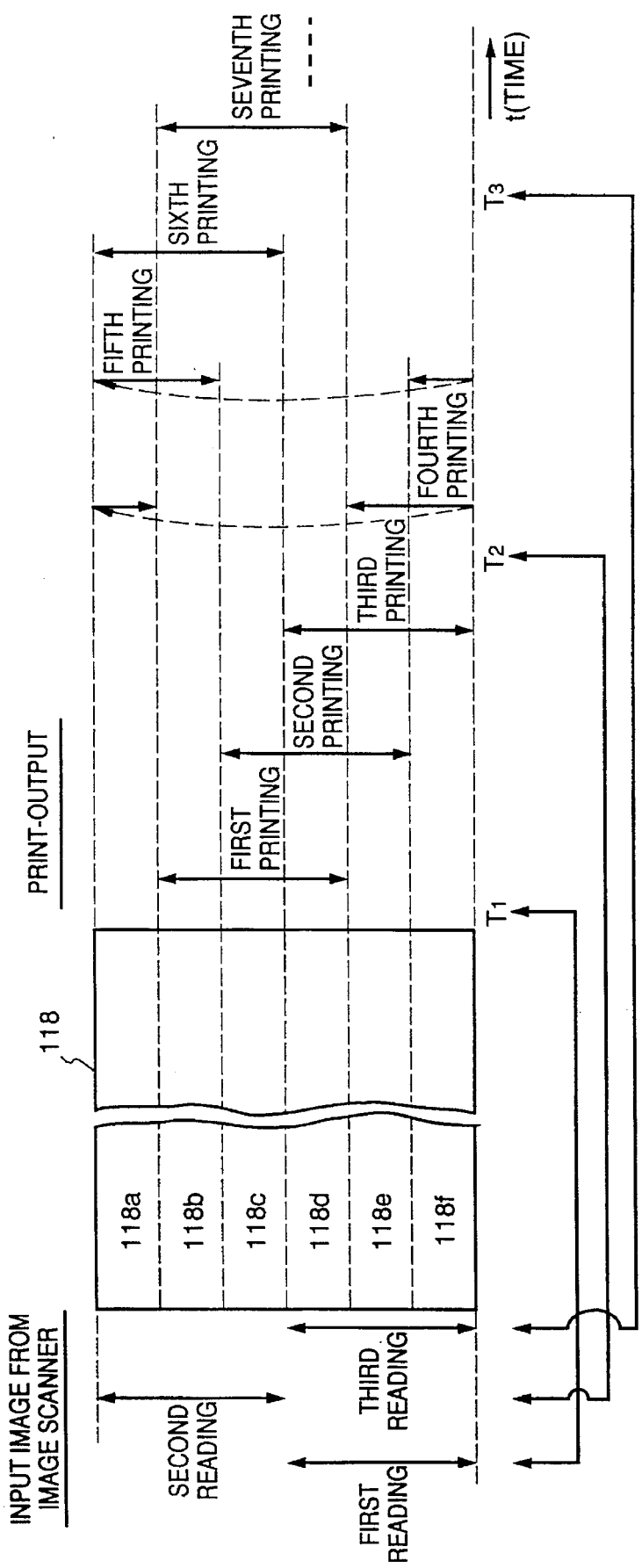
FIG. 4 is a timing chart showing timings of reading, storing and outputting operations in the first embodiment.

FIG. 4 shows the structure of the memory 118, reading timings of the image sensor and printing timings to realize the operations shown in FIGS. 2 and 3.

The memory 118 has a capacity for storing read image data obtained from two scannings of the image sensor. The memory is evenly divided into six areas as areas 118a to 118f. The areas 118a to 118f are initialized "0" prior to the start of printing.

Upon the first reading by the image sensor, the read data is stored into the areas 118d, 118e and 118f of the memory 118 via the shading corrector 107. It should be noted that the reading and storing operations are performed at timing $T_1$ which is the previous timing of the first printing by the printing head 122.

Figure 5:
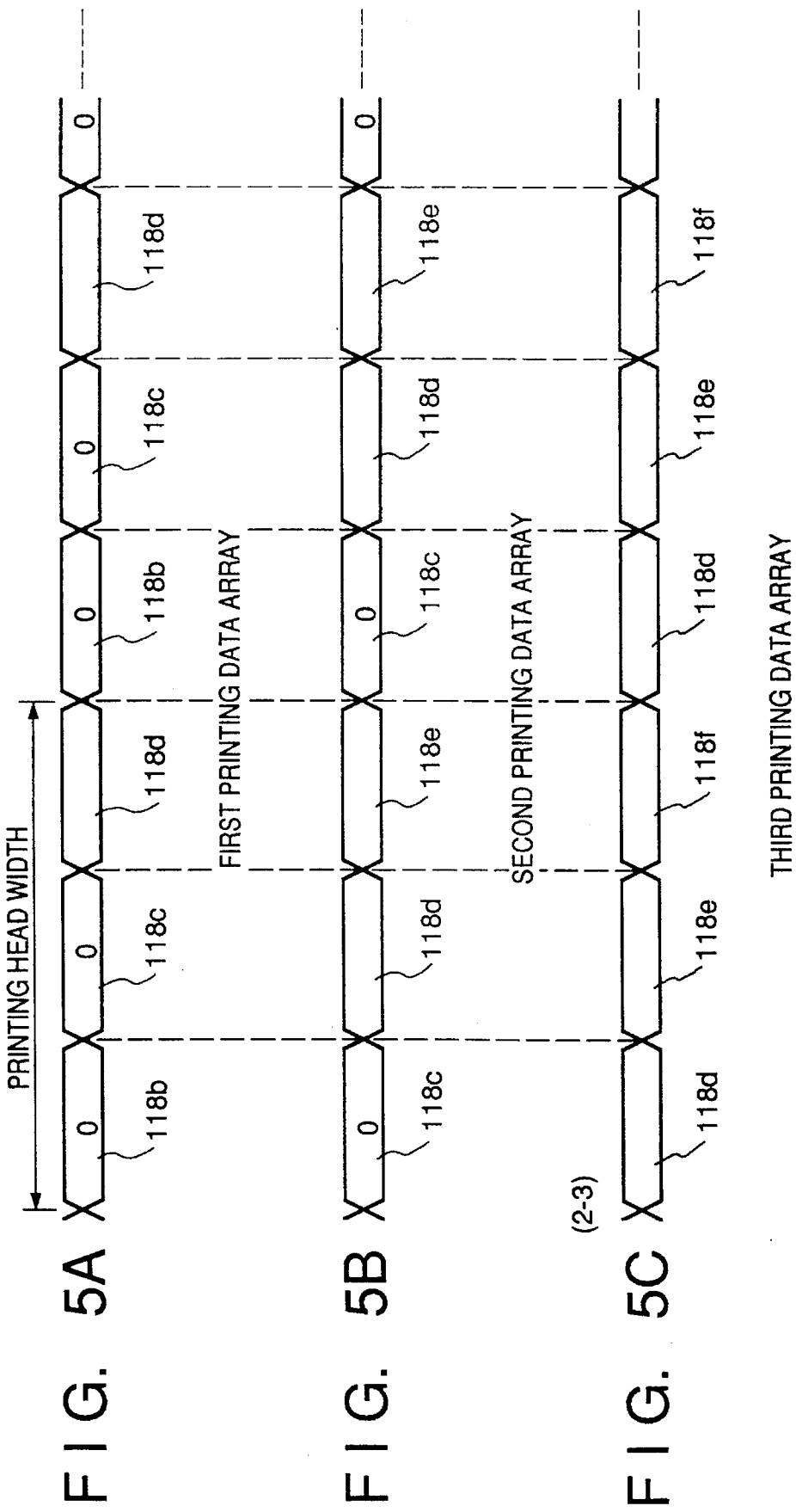
FIGS. 5A to 5C illustrate data transferred to the printing head.

When the first reading is completed, the data in the areas 118b, 118c and 118d of the memory 118 are outputted to the masking corrector 108 for printing the data from these areas (the first scan-printing). The first printing corresponds to "1" of the printing order shown in FIG. 2 and to (2-1) in FIG. 3 in which the areas 118b and 118c are filled with "0" data. FIG. 5A shows the timing of the data transfer to the printing head at this time. Upon the second scan-printing, the data in the areas 118c, 118d and 118e are outputted to the masking corrector 108 ((2-2) in FIG. 3). FIG. 5B shows the timing Of the data transfer to the printing head at this time. Upon the third printing, the data in the areas 118d, 118e and 118f are outputted ((2-3) in FIG. 3). FIG. 5C shows the timing of the data transfer to the printing head at this time. At this time (from the completion of the second printing to the beginning of the fourth printing at timing $T_2$), as the existence of data in the areas 118a, 118b and 118c become meaningless (as they are already printed), the image sensor performs the second reading, and the image data are shading-corrected and stored into the areas 118a, 118b and 118c. The image sensor may perform reading when the amount of printed-data in the memory 118 corresponds to amount of one scanning of the printing head or more.

When the second image reading is over, the fourth scan-printing of the printing head is executed. In this case, the image data in the areas 118e, 118f and 118a are outputted to the masking corrector 108 ((2-4) in FIG. 3). Thus, the readings and printings are repeated in accordance with timings as shown in FIG. 4. Upon the last two printings, printing heads which are not concerned with these printings are provided with non-printing data (=0).

Reading of the image, storing of the read data into the memory 118 and outputting the data are executed at the timings as described above. Followings are actual printing processings.

The printing head 122 in the present embodiment comprises four printing head portions for respective color components (C, M, Y and BK), each head portion having n-ink discharging nozzles aligned in a longitudinal direction of the head 122. The nozzles are divided into three groups. A four-level image is recorded by overstrike printing shifting the three nozzle groups.

The four-level processor 115 determines whether or not to use only the first group to discharge an ink drop for density level "1", then whether or not to also use the second group to discharge an ink drop for density level "2" and whether or not to further use the third group to discharge an ink drop for density level "3".

For the sake of simplification of explanation, in the four-level processor 115, a threshold upon generating a binary image recorded by the first nozzle group is $Th_1$, a threshold upon generating a binary image recorded by the second group is $Th_2$ and a threshold for the third group is $Th_3$. The relation among the thresholds is:

$$Th_1<Th_2<Th_3$$

This relation can be applied to all the recording color components. If the density of an input image pixel is lower than $Th_1$, the density level is determined to be "0"; if the density is over $Th_1$ and lower than $Th_2$, the density level is determined to be "1"; if the density is over $Th_2$ and lower than $Th_3$, the density level is determined to be "2"; and if the density is over $Th_3$, the density level is determined to be "3".

It should be noted that this does not pose any limitation upon the present invention, and any binary processing which determines whether or not there will be discharging of an ink drop at each nozzle group can be used.

Figure 6:
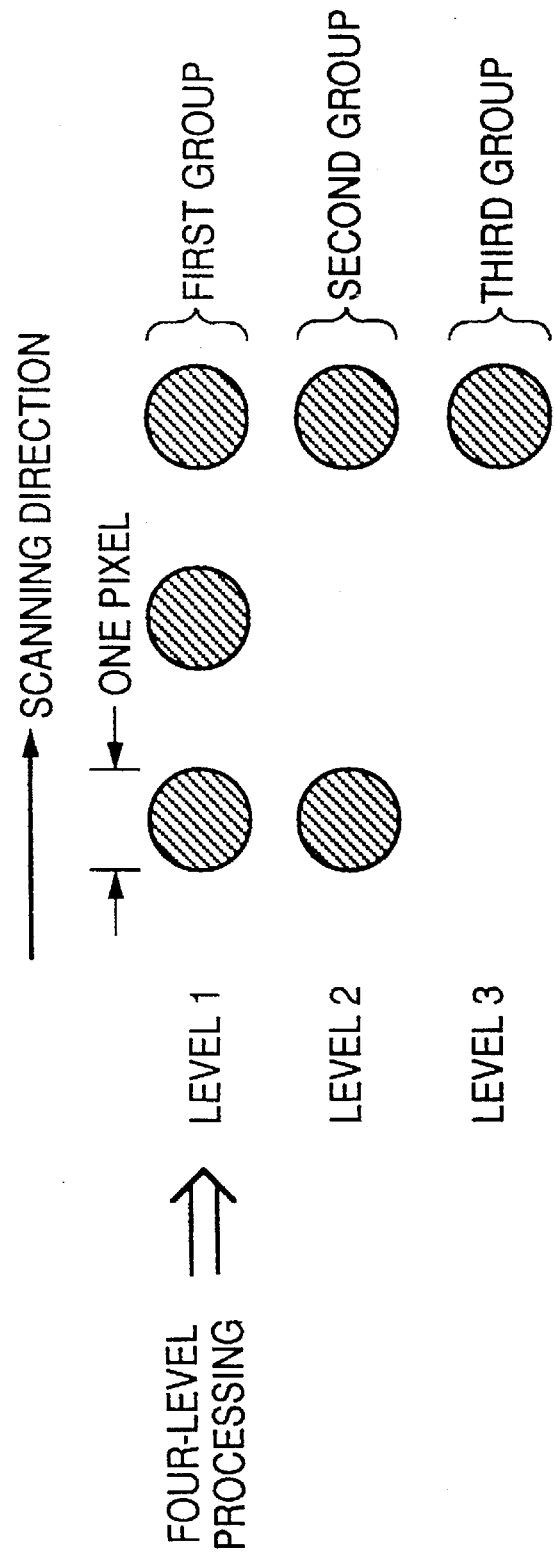
FIG. 6 illustrates the relation between respective groups of the printing head and four-level image pixels.

FIG. 6 shows that the first printing pixel is recorded by the first and second nozzle groups; the second pixel, by only the first group; and the third pixel, by the first to third groups. In this manner, one printing pixel can be represented by 0 to 3 four-level density value.

As described above, the present embodiment reduces the number of reading operations and prevents variation in printing data due to noise of an image signal.

[Second Embodiment]

Next, the second embodiment of the present invention will be described below.

Figure 7:
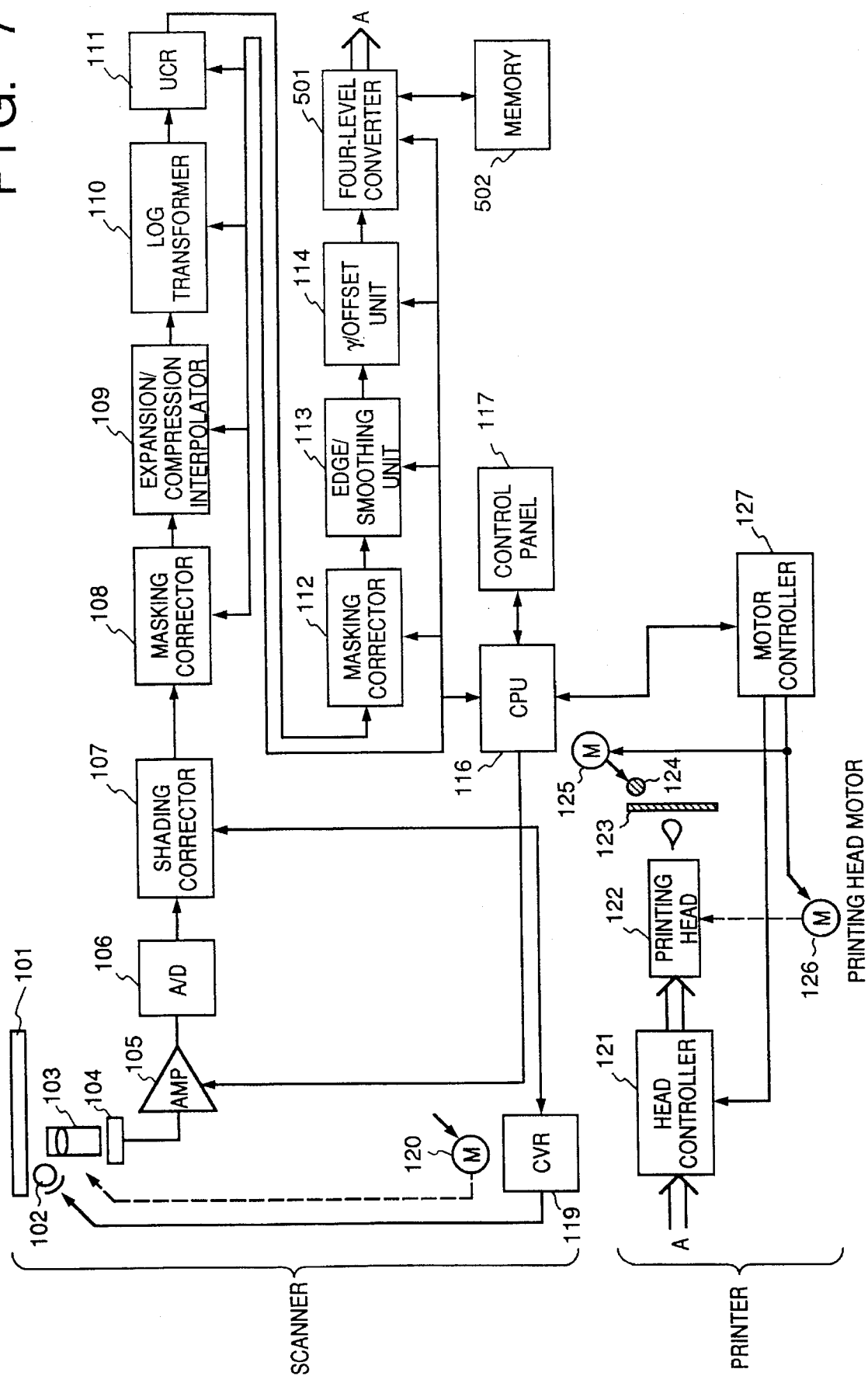
FIG. 7 is a block diagram showing the configuration of a copying machine according to a second embodiment.

FIG. 7 is a block diagram showing the configuration of a copying machine according to the second embodiment.

In the first embodiment, input RGB multi-level data is stored into the memory, and the processing by the masking corrector 108 and the-subsequent processings are repeated at each scan-printing of the printing head, however, the present invention is not limited to this arrangement.

In the second embodiment, four-level data for respective C, M, Y, K components are stored immediately before recording. Note that image reading scannings and printings are performed at timings similar to those in the first embodiment.

Accordingly, the difference between FIGS. 7 and 1 is only the positions of memory 502 and four-level converter 501 in FIG. 7. Other elements in FIG. 7 correspond to those in FIG. 1 and therefore the corresponding elements have the same reference numerals and the explanations of these elements will be omitted.

The four-level converter 501 converts YMCK multi-level data obtained from the γ/offset unit 114 into binary data to be printed by the first to third nozzle groups of the printing head in color component units.

Figure 8:
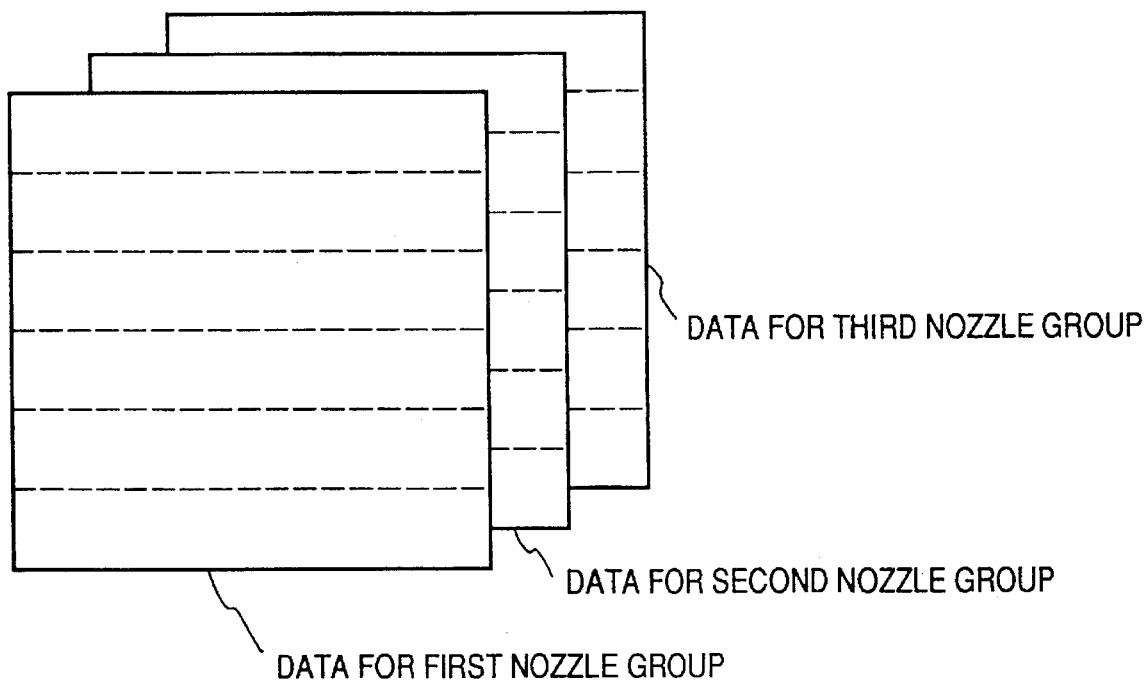
FIG. 8 illustrates four-level image data stored in a memory for one recording color component in the second embodiment.
Figure 12:
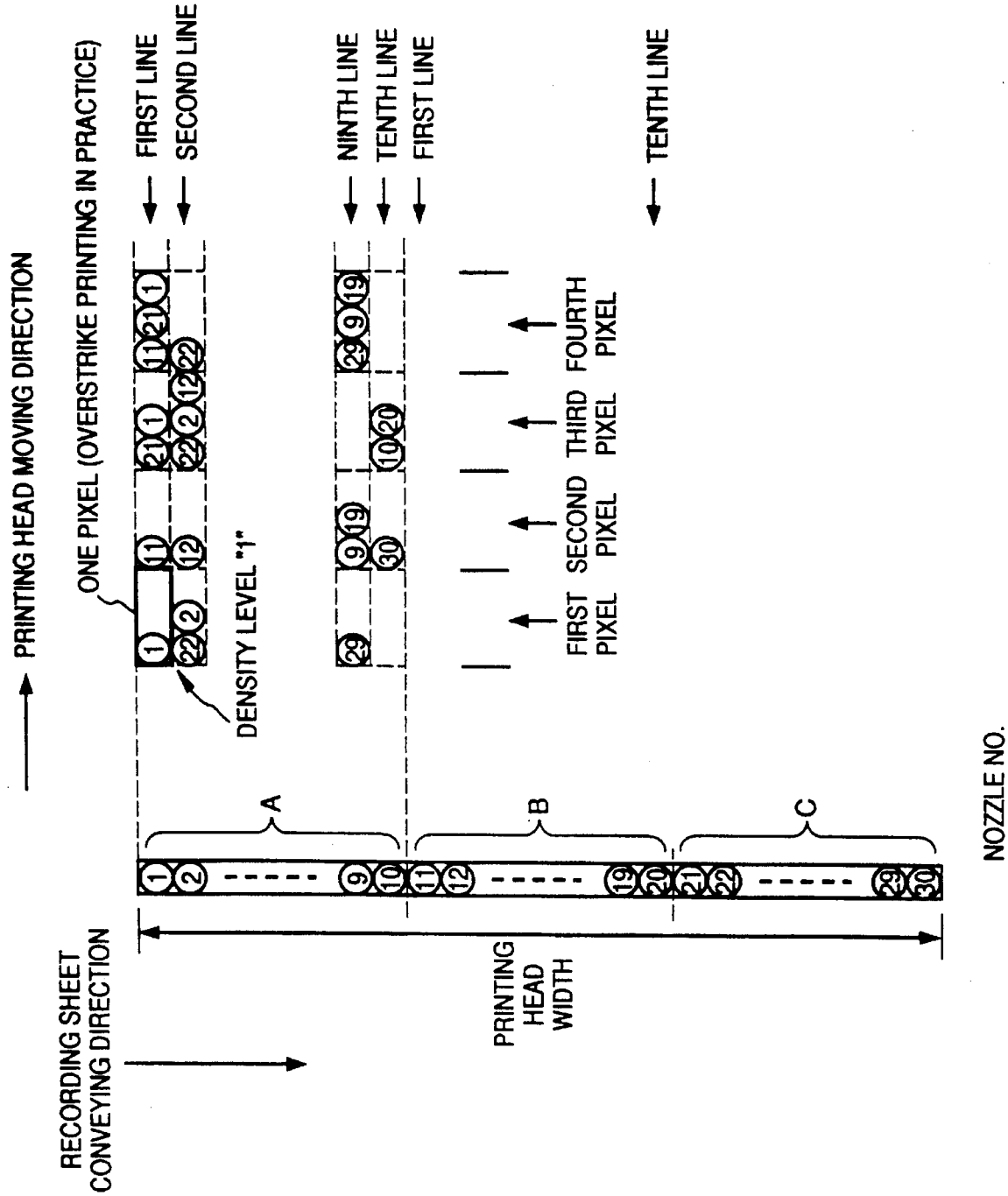
FIG. 12 conceptually illustrates overstrike recording by a multi-nozzle.

For example, Y component memory in the memory 502 is arranged as shown in FIG. 8. Other component memories have similar structures.

As shown in FIG. 8, the Y component memory has a plane for storing binary data (data of discharging/non-discharging an ink) to be recorded by the first nozzle group of the printing head, a plane for storing binary data to be recorded by the second group and a plane for binary data to be recorded by the third group. Similarly to the first embodiment, each plane has a capacity for storing image data by two readings.

Next, the printing operation in this embodiment will be described with reference to FIGS. 9 to 11.

In the first scan-printing of the printing head, the first nozzle group of the printing head prints area 1-(a) in FIG. 10, and the second and third groups do not print any data (this status is represented as " white (0) in FIGS. 11A to 11C). FIG. 11A shows the timing of data transfer to the printing head at this time.

In the second scan-printing of the printing head, the first nozzle group prints area 1-(b), the second group prints area 2-(a) and the third group does not print any data. FIG. 11B shows the timing of data transfer to the printing head at this time.

In the third scan-printing of the printing head, the first group print area 1-(c), the second group prints 2-(b) and the third group prints area 3-(a). These processings are continued in this manner. Further, other color component data are processed in a similar manner.

In the second embodiment, one color component memory is divided into three planes, however, this does not pose any limitation upon the present invention. The memory can manage four-level data using only one plane, if it manages the data by three bits.

As described above, the present embodiment reduces the number of reading operations and prevents variation in printing data due to noise of an image signal.

In the first and second embodiments, a color image is recorded with four density levels, however, the present invention is not limited to this arrangement. It goes without saying that more/less density levels can be applied to the recording operation.

In these embodiments, an ink-jet printer is employed as an example of the printer, however, the printer is not limited to the ink-jet printer. The embodiments is applicable to any type of printer which forms a printing pixel having gradation by overstrike recording (printing at one pixel position plural times).

The structure of the printer of the embodiments and operations of the constituents of the printer will be described with reference to FIG. 14.

Figure 14:
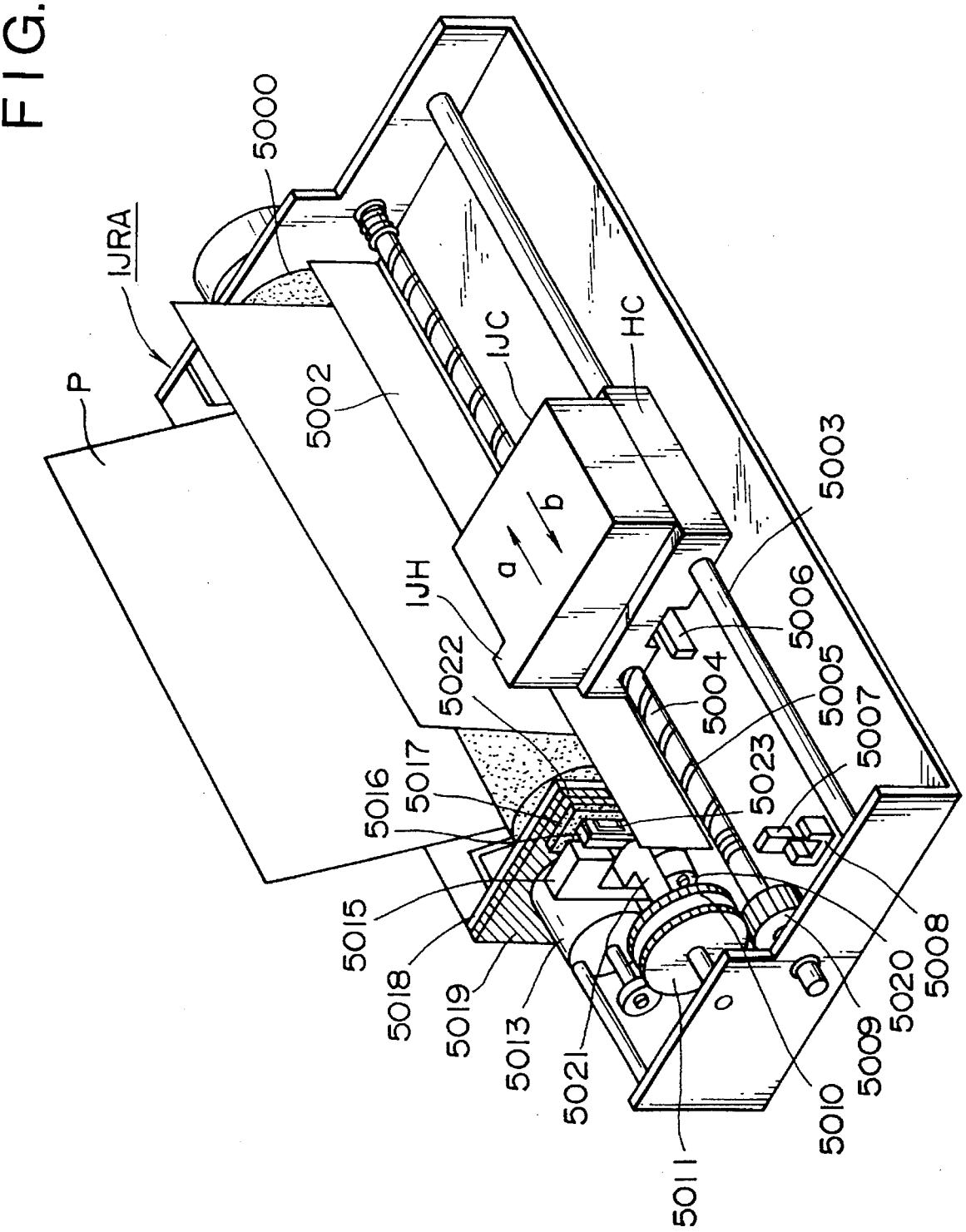
FIG. 14 is a diagram showing the construction of a printer in the embodiments.

In FIG. 14, carriage (HC) is engaged with spiral groove 5004 of lead screw 5005 which rotates via driving force transmission gears 5011 and 5009 interlocking with forward/reverse rotation of driving motor 5013. The carriage has a pin (not shown) to fit in the thread of the lead screw 5005 and it is reciprocally moved in directions represented by arrows a and b along guide 5003. The carriage has an ink-jet cartridge (IJC), which comprises printing heads for C, M, Y and BK color components. Each printing head has a plurality of nozzles aligned in the longitudinal direction of the carriage. As described above, these nozzles are divided into three groups and are driven in group units. Paper bail 5002 presses a recording sheet against platen 5000 along the moving direction of the carriage. Photocouplers 5007 and 5008 are home position detecting members for confirming the existence of lever 5006 of the carriage in this area and changing over the rotational direction of motor 5013. Support member 5016 supports cap member 5022 for capping the front surface of the printing head. Suction member 5015 performs suction-restoration of the printing head the inside of the cap member 5022 via cap inner opening 5023. Member 5019 allows cleaning blade 017 to move in a back-and-forth direction. Main body support plate 5018 supports the member 5019 and the cleaning blade 5017. It goes without saying that any publicly-known cleaning blade is applicable to the printer of the embodiments. Numeral 5021 denotes a lever for starting the sucking operation of the suction-restoration. The lever 5021 moves along the movement of cam 5020 engaged with the carriage. A publicly-known transmission means such as change over of a clutch controls a driving force from the driving motor.

When the carriage arrives at the home position, a desired processing among the capping, cleaning and suction-restoration is executed at its corresponding position by the lead screw 5005. Any of these processings is applicable to the printer of the embodiments, if a desired processing is performed at a publicly-known timing.

As described above, the first and second embodiments reduce the number of reading operations and prevent variations in printing data due to noise of an image signal.

[Third Embodiment]

In the previous embodiments, the combination of nozzle groups of the printing head to record a density level is fixed. Still there might occur density unevenness due to difference in usage frequency between the respective nozzle groups.

Accordingly, in the third embodiment, in accordance with a density level value of one complete pixel, nozzle groups are sequentially assigned to overstrike recording so that the frequency of usage of the respective groups becomes substantially equal to each other.

In FIG. 15, the pixels respectively have density levels 2, 1 and 3. The first pixel is recorded with two ink drops; the second pixel, with one ink drop; and the third pixel, with three ink drops. This corresponds to FIG. 6, however, the third embodiment has the following difference.

In this embodiment, the logical ink-discharging order is fixed as the first group→the second group→the third group→the first group . . . regardless of the position of a pixel to be recorded.

Accordingly, the first pixel 40 in FIG. 15 is printed by discharging an ink drop using the first group at the first recording and discharging an ink drop using the second group at the second recording. As the density level of the pixel 40 is "2", ink-discharging for the pixel 40 is not performed any longer. Upon printing the next pixel 41, as the first and second groups have already been used, the third group is used to discharge an ink drop. The density level of the pixel 41 is "1" and the ink-discharging for this pixel is completed. Upon printing the third pixel 42, as the nozzle groups have been used from the first group to third group, again the first group is employed. As the density level of the pixel 42 is "3", the second and third groups are subsequently used.

It will be understood that the above recording order is a logical order and its practical order is as shown in FIG. 16.

More specifically, upon the first scanning of the printing head, corresponding nozzles discharge an ink drop at the positions of the pixels 40 and 42. Upon the second scanning, corresponding nozzles discharge an ink drop at the positions of the pixels 41 and 42. Upon the third scanning, corresponding nozzles discharge an ink drop at the positions of the pixels 41 and 42.

As a result, the pixel 40 has a density level "2"; the pixel 41, a density level "1"; and the pixel 42, a density level "3".

As described above, the third embodiment easily realizes binary status processing of discharging/non-discharging of an ink drop by simply assigning the nozzle groups in accordance with the order of groups, and obtains an excellent image.

In the first to third embodiments, a multi-color recording apparatus is used as an example, however, this does not impose any limitation upon the present invention. The present invention is also applicable to a monochrome recording apparatus. Further, in the first to third embodiments, multi-level recording is described as an example, however, the present invention is not limited to this recording.

According to the present invention, in a case where the printing head records one line (the same area) by its plural scannings, e.g., it records one line by overstrike printing, the image sensor (printing head) reads one line only once.

Accordingly, the present invention can be applied to binary recording in which one line is complementarily scan-printed plural times and emphasis recording in which recording of one line is repeated plural times with the same data.

As described above, in an apparatus having a recording width that of its printing head, three recording processings by the printing head are executed based on an image read at one reading processing, which prevents density unevenness due to noise.

It should be noted that the present invention is not limited to a copying machine, but is applicable to an apparatus separately comprising an image reader, a printer and a control device for controlling the reader and the printer, since the above-described processings can be realized if the controller has control programs for controlling the reader and the printer in accordance with the processings of the present invention.

In the first to third embodiments, the reading width of the scanner is thrice of the printing head however, the reading width may be wider or narrower than this width. In addition, it is not necessary that the reading width be an integral multiple of the printing head width.

The present invention brings about excellent effects particularly in a recording head and a recording device of the ink jet system using a thermal energy among the ink jet recording systems.

As to its representative construction and principle, for example, one practiced by use of the basic principle disclosed in, for instance, U.S. Pat. Nos. 4,723,129 and 4,740, 796 is preferred. The above system is applicable to either one of the so-called on-demand type and the continuous type. Particularly, the case of the on-demand type is effective because, by 5 applying at least one driving signal which gives rapid temperature elevation exceeding nucleus boiling corresponding to the recording information on electro-thermal converting elements arranged in a range corresponding to the sheet or liquid channels holding liquid (ink), heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the abovementioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in JP-A-59-123670 which discloses the construction using a slit common to a plurality of electrothermal converting elements as a discharging portion of the electrothermal converting element or JP-A-59-138261 which discloses the construction having the opening for absorbing a pressure wave of a heat energy corresponding to the discharging portion.

In addition, the invention is effective for a recording head of the freely exchangeable chip type which enables electrical connection to the main device or supply of ink from the main device by being mounted onto the main device, or for the case by use of a recording head of the cartridge type provided integrally on the recording head itself.

It is also preferable to add a restoration means for the recording head, preliminary auxiliary means, and the like provided as a construction of the recording device of the invention because the effect of the invention can be further stabilized. Specific examples of them may include, for the recording head, capping means, cleaning means, pressurization or aspiration means, and electrothermal converting elements or another heating element or preliminary heating means according to a combination of them. It is also effective for performing a stable recording to realize the preliminary mode which executes the discharging separately from the recording.

As a recording mode of the recording device, further, the invention is extremely effective for not only the recording mode of only a primary color such as black or the like but also a device having at least one of a plurality of different colors or a full color by color mixing, depending on whether the recording head may be either integrally constructed or combined in plural number.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which records a multilevel image by scanning of a recording head having an array of M-pixel recording elements divided into N groups, and by conveying a recording medium by a width of one group at one scanning of the recording head, comprising:

image reading means for reading an original image in units, each unit being a band, the band having a width corresponding to a width of the array of M-pixel recording elements;

memory means for storing as an image data a portion of the read original image over at least two band units;

recording data generation means for generating binary data corresponding to the respective groups of the recording head in accordance with the image data stored in said memory mean; and control means for supplying the binary data generated by said recording data generation means to corresponding groups of the recording head.

2. The apparatus according to claim 1, wherein said M-recording elements are uniformly aligned.

3. The apparatus according to claim 1, wherein each of said M-recording elements records a pixel by discharging an ink.

4. The apparatus according to claim 3, wherein each of said M-recording elements discharges an ink by thermal energy.

5. The apparatus according to claim 1, wherein said M-recording elements are equally divided.

6. The apparatus according to claim 1, wherein said image reading means is activated when an amount of at least one of the recorded data or the image data which is meaningless corresponds to an amount of scannings of the N-groups of the recording head.

7. The apparatus according to claim 1, wherein said image reading means includes means for converting the read image data into N+1 gradation data.

8. The apparatus according to claim 1, wherein when a density level of an object pixel to be recorded is $d(1 \leq d \leq N)$, said control means activates recording corresponding elements in from first to d-th groups of the recording head.

9. The apparatus according to claim 1, wherein when a density level of an object pixel to be recorded is $d(1 \leq d \leq N)$, said control means sequentially activates corresponding recording elements in d-groups of the recording head from a group next to i-th group $(1 \leq i \leq N)$ having recording means for completing a density of a previous pixel of the object pixel to be recorded.

10. An image processing apparatus which records a multilevel image by scanning of a recording head having an array of M-pixel recording elements divided into N groups, and by conveying a recording medium by a width of one group at one scanning of the recording head, comprising:

image reading means for reading an original image in units, so as to provide an image data, each unit being a band, the band having a width corresponding to a width of the array of M-pixel recording elements;

recording data generation means for generating binary data corresponding to the respective groups of the recording head in accordance with an image data read by said image reading means;

memory means for storing the binary data generated by said recording data generation means for the respective groups of the recording head; and control means for supplying the binary data for the respective groups of the recording head stored in said memory means to the groups of the recording head respectively.

11. The apparatus according to claim 10, wherein said M-recording elements are uniformly aligned.

12. The apparatus according to claim 10, wherein each of said M-recording elements records a pixel by discharging an ink.

13. The apparatus according to claim 12, wherein each of said M-recording elements discharges an ink by thermal energy.

14. The apparatus according to claim 10, wherein said M-recording elements are equally divided.

15. An image processing apparatus comprising:

reading means, having a plurality of reading elements of P-dot lines, for reading an original image by scanning so as to provide an image data;

a recording head having M-recording elements divided into N-recording groups (N≧2);

convey means for conveying a predetermined recording medium by one recording group width at one scanning of said recording head;

memory means for storing read image data for at least two scannings of said reading means so as to provide the image data to said recording head; and control means for activating said reading means when there is no image data to be recorded for one scanning of said recording head, or when the amount of recorded image data or image data which is meaningless in said memory means corresponds to an amount of one scanning of said recording head.

16. The apparatus according to claim 15, wherein said M-recording elements are uniformly aligned.

17. The apparatus according to claim 15, wherein said recording head has an ink jet nozzle.

18. The apparatus according to claim 17, wherein the nozzle discharges an ink by thermal energy.

19. The apparatus according to claim 15, wherein said M-recording elements are equally divided.

20. The apparatus according to claim 15, further comprising N+1 level processing means for converting respective pixel data of the image data stored in said memory means into N+1 level data, wherein said control means includes activation means for activating corresponding recording elements in the respective recording groups of said recording head at a predetermined timing based on the N+1 leveled pixel data converted by said N+1 processing means.

21. The apparatus according to claim 20, wherein when the N+1 level pixel value data has a value i, where i is between 1 and N, said activation means activates corresponding recording elements in from first to i-th groups of the recording head.

22. The apparatus according to claim 20, wherein when the N+1 level pixel data has a value i, where i is between 1 and N, said activation means activates corresponding recording elements in i-groups of the recording head from a group next to j-th group, where i is between 1 and N, having a recording element for completing a density of a previous pixel of an object pixel to be recorded.

23. A method for controlling an image processing apparatus comprising reading means, having a reading element for P-dot line, for reading an original image by scanning, a recording head having M-recording elements divided into N-recording groups (N≧2), and memory means for storing image data read by said reading means, the image data being recorded by said recording head, comprising the steps of:

conveying a predetermined recording medium by one recording group width at one scanning of said recording head; and storing the read image data into said memory means by activating said reading means when there is no image data to be recorded for one scanning of said recording head, or when the amount of recorded image data or the image data which is meaningless in said memory means corresponds to an amount of one scanning of said recording head.

24. The method according to claim 23, further comprising the steps of;

converting respective pixel data of the image data stored in said memory means into N+1 level data; and activating corresponding recording elements in the respective recording groups of said recording head at a predetermined timing based on the N+1 leveled pixel data converted by said N+1 processing means.

25. The method according to claim 24, wherein, in the activating step, when the N+1 level pixel data has a value i, where i is between 1 and N, corresponding recording elements in from first to i-th groups of the recording head are activated.

26. The method according to claim 24, wherein, in the activating step, when the N+1 level pixel data has a value i, where i is between 1 and N, corresponding recording elements in i-groups of the recording head are activated from a group next to the j-th group, where j is between 1 and N, having a recording element for completing a density of a previous pixel of an object pixel to be recorded.

27. An image processing apparatus which records an image read by scanning of a reading head on a recording medium by scanning of a recording head, comprising:

read-scanning means for sequentially moving the reading head relatively to an original so as to read an original image; and record-scanning means for moving said recording head relative to a predetermined area of the recording medium plural times in response to one read-scanning of the reading head by said read-scanning means so as to record a recorded image corresponding to the read original image on the predetermined area, wherein said recorded image recorded by the recording head on the predetermined area is based on the original image read by the read-scanning means.

28. The apparatus according to claim 27, wherein said record-scanning means performs the record-scanning of said recording head plural times using different portions of said recording head upon the area of the recording medium.

29. The apparatus according to claim 28, wherein the plural record-scannings of said recording head records a gradation image.

30. The apparatus according to claim 27, wherein said record-scanning means performs the record-scanning of said recording head plural times upon the area of the recording medium using a same portion of said recording head.

31. The apparatus according to claim 30, wherein the plural record-scannings of said recording head records an emphasized image.

32. The apparatus according to claim 27, further comprising storage means for storing the image read in accordance with at least two read-scannings of said reading head by said read-scanning means.

33. The apparatus according to claim 27, wherein said recording head discharges an ink.

34. The apparatus according to claim 33, wherein said recording head discharges an ink by thermal energy.

35. The apparatus according to claim 27, further comprising convey means for conveying the recording medium by a width of the predetermined area in a direction different from that of the record-scanning of said recording head.

36. An image processing method for recording a read image, comprising the steps of:

read-scanning the reading head relatively to an original so as to read an original image;

récord-scanning said recording head relative to a predetermined area of the recording medium plural times in response to one read-scanning of the reading head by said read-scanning step so as to record a recorded image corresponding to the read original image on the predetermined area; and repeating said read-scanning step and said record-scanning step so as to complete the recording of the original image, wherein said recorded image recorded by the recording head on the predetermined area is based on the original image read in the read-scanning step.

37. The method according to claim 36, wherein in the record-scanning step, the record-scanning of said recording head is performed plural times using different portions of said recording head upon the area of the recording medium.

38. The method according to claim 37, wherein the plural record-scannings of said recording head in the record-scanning step records a gradation image.

39. The method according to claim 36, wherein in the record-scanning step, the record-scanning of said recording head is performed plural times upon the area of the recording medium using a same portion of said recording head.

40. The method according to claim 39, wherein the plural record-scannings of said recording head in the record-scanning step records an emphasized image.

41. The method according to claim 36, further comprising the step of:

storing the image read in accordance with at least two read-scannings of said reading head in the read-scanning step.

42. The method according to claim 36, wherein said recording head discharges an ink.

43. The method according to claim 42, wherein said recording head discharges an ink by thermal energy.

44. The method according to claim 36, further comprising the step of:

conveying the recording medium by a width of the predetermined area in a direction different from that of the record-scanning of said recording head.

* * * * *

UNITED STATES PATENT AND TRADEMARK OFFICE
CERTIFICATE OF CORRECTION

PATENT NO. : 5,572,329

DATED : November 5, 1996

INVENTOR(S) : TOSHIHIKO OTSUBO, ET AL.          Page 1 of 3

It is certified that error appears in the above-identified patent and that said Letters Patent is hereby corrected as shown below:

```
On the title page, item
[56] References Cited

"0517544 12/1992 United Kindom" should
read --0517544 12/1992 Euro. Pat. Off.--.
```

COLUMN 2

```
Line 27, "image" should read --images--. (Second occurrence)
Line 38, "By" should read --by--.
```

COLUMN 4

```
Line 59, "drop" should read --drop.--.
Line 62, "explanations" should read --explanation--.
```

COLUMN 5

```
Line 5,  "image" should read --images--.
Line 35, "level" should read --levels--.
```

COLUMN 6

```
Line 4, "y/offset" should read --γ/offset--.
```

UNITED STATES PATENT AND TRADEMARK OFFICE
CERTIFICATE OF CORRECTION

PATENT NO. : 5,572,329

DATED : November 5, 1996

INVENTOR(S): TOSHIHIKO OTSUBO, ET AL.

It is certified that error appears in the above-identified patent and that said Letters Patent is hereby corrected as shown below:

COLUMN 9

Line 26, "head" should read --head to--.
  Line 27, "017" should read --5017--.
  Line 36, "change,over" should read --change-over--.

COLUMN 10

Line 47, "width" should read --width thrice--.
  Line 60, "thrice" should read --thrice that-- and "head" should read --head,--.

COLUMN 11

Line 6, "5" should be deleted.

COLUMN 12

Line 21, "mean;" should read --means;--.
  Line 45, "recording" should read --recording by--.

UNITED STATES PATENT AND TRADEMARK OFFICE
CERTIFICATE OF CORRECTION

PATENT NO. : 5,572,329

DATED : November 5, 1996

INVENTOR(S) : TOSHIHIKO OTSUBO, ET AL.

It is certified that error appears in the above-identified patent and that said Letters Patent is hereby corrected as shown below:

COLUMN 13

Line 63, "i" should read --j--.

COLUMN 14

Line 1, "line," should read --lines,--.
Line 17, "of;" should read --of:--.

Signed and Sealed this

Fifteenth Day of April, 1997

Attest:

BRUCE LEHMAN

Attesting Officer    Commissioner of Patents and Trademarks